United States Patent [19]
Yoshizaki

[11] Patent Number: 5,224,335
[45] Date of Patent: Jul. 6, 1993

[54] EXHAUST EMISSION CONTROL APPARATUS FOR INTERNAL COMBUSTION ENGINE

[75] Inventor: Kouji Yoshizaki, Sunto, Japan

[73] Assignee: Toyota Jidosha Kabushiki Kaisha, Toyota, Japan

[21] Appl. No.: 846,467

[22] Filed: Mar. 4, 1992

[30] Foreign Application Priority Data

Mar. 8, 1991 [JP] Japan ................................ 3-43828

[51] Int. Cl.⁵ .............................................. F01N 3/20
[52] U.S. Cl. ......................................... 60/300; 60/277
[58] Field of Search ................... 60/300, 277; 422/174, 422/180

[56] References Cited

U.S. PATENT DOCUMENTS

| | | | |
|---|---|---|---|
| 4,102,127 | 4/1978 | Saiki et al. | 60/284 |
| 4,928,485 | 12/1990 | Whittenberg | 60/300 |
| 5,146,743 | 9/1992 | Maus | 60/300 |

FOREIGN PATENT DOCUMENTS

| | | | |
|---|---|---|---|
| 2233793 | 1/1974 | Fed. Rep. of Germany | 60/300 |
| 1308736 | 9/1961 | France | 60/284 |
| 22313 | 3/1972 | Japan . | |
| 124412 | 11/1974 | Japan . | |
| 95417 | 9/1978 | Japan . | |

*Primary Examiner*—Douglas Hart
*Attorney, Agent, or Firm*—Kenyon & Kenyon

[57] ABSTRACT

An exhaust emission control apparatus includes an electrically heatable catalytic converter mounted in an exhaust passage of an internal combustion engine, the catalytic converter having a catalyst for catalytic conversion of exhaust gases from the engine and a heating element for heating the catalyst to accelerate a rate of the catalytic conversion, a power supply for applying power to the heating element, a time setting part for calculating a time period during which power is applied to the heating element, and a control part for controlling application of power from the power supply to the heating element in accordance with the calculated time period in a way that the application of power to the heating element is stopped when the time period since the application of power to the heating element is started has elapsed.

9 Claims, 7 Drawing Sheets

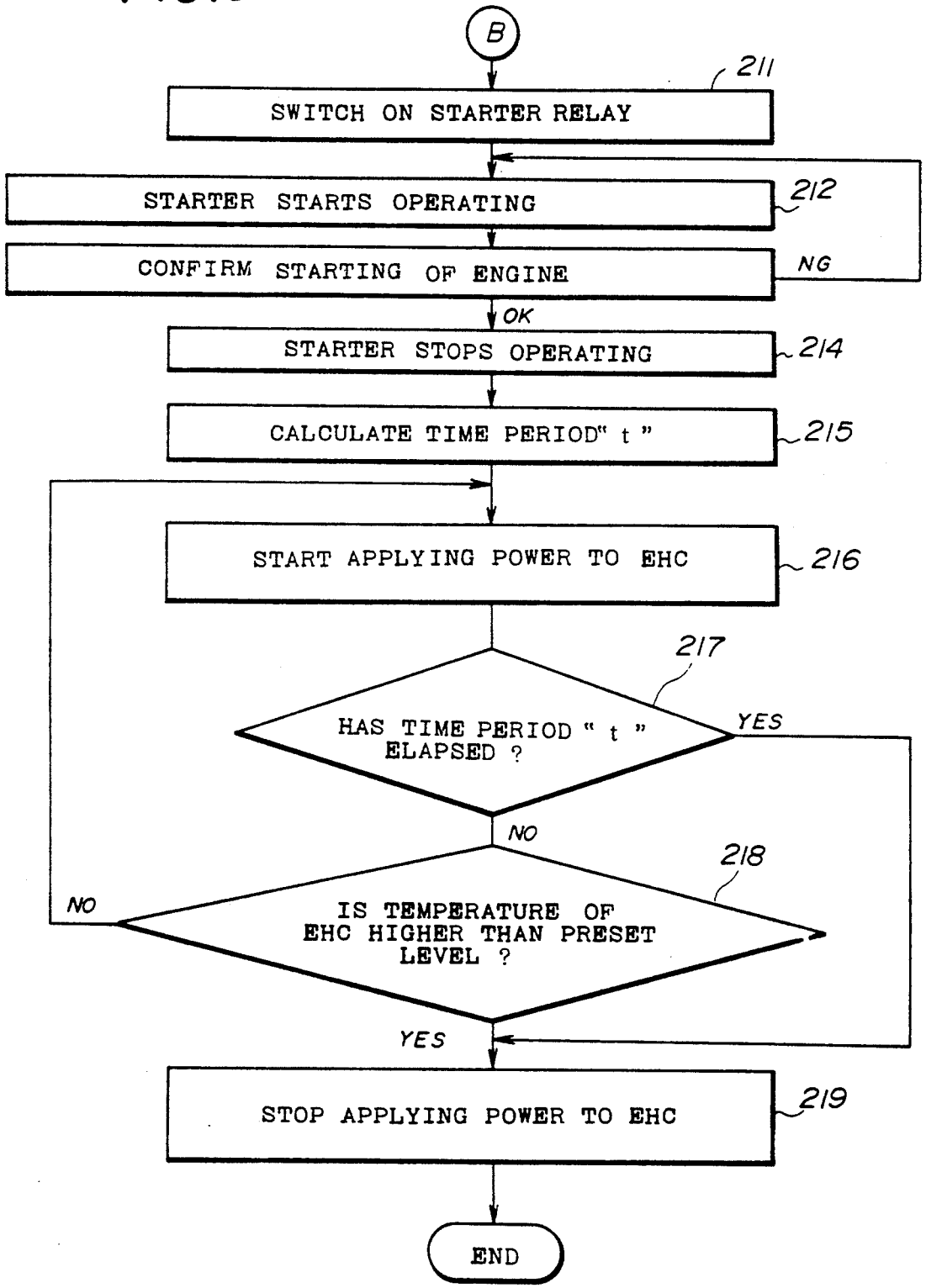

EXHAUST EMISSION CONTROL APPARATUS FOR INTERNAL COMBUSTION ENGINE

BACKGROUND OF THE INVENTION (1) Field of the Invention

The present invention generally relates to an exhaust emission control apparatus for an internal combustion engine, and more particularly to an exhaust emission control apparatus for an internal combustion engine in which electric power is applied to a heating element of a catalytic converter mounted in an exhaust passage of the engine, and a catalyst of the catalytic converter is heated by the heating element to accelerate a rate of catalytic conversion of exhaust gases.

(2) Description of the Related Art

An exhaust emission control apparatus including a catalytic converter is provided in an exhaust passage of an internal combustion engine to carry out catalytic conversion of exhaust gases from the engine. This catalytic conversion of exhaust gases implies catalytic activity by a catalyst in the catalytic converter for accelerating oxidization of carbon monoxide (CO) and hydrocarbon (HC) in the exhaust gases and/or accelerating reduction of oxygen nitride (NOx) in the exhaust gases. However, the catalyst in the catalytic converter is not active and the efficiency of the catalytic conversion is extremely low when the temperature of the catalyst is still low, that is, it has not yet reached a catalyst activation level. Once the engine starts operating, the temperature of the catalyst is increased due to the heat of exhaust gases passing into the exhaust passage. But, when the engine undergoes a cold start and has still not warmed up, the heat of exhaust gases is low and the temperature of the catalyst does not rise quickly to the above mentioned catalyst activation level. The engine in such a condition exhibits a poor level of fuel combustion efficiency, and it is difficult for efficient catalytic conversion of exhaust gases to be performed by a catalyst with a low temperature, that is below the catalyst activation level.

In the prior art, there is a disclosure of a catalytic converter for an internal combustion engine. For example, Japanese Laid-Open Utility Model Application No. 49-124412 discloses a catalytic converter including a catalyst and a heater provided within the catalytic converter for heating the catalyst to accelerate the rate of the catalytic conversion of exhaust gases. Electric power is applied to the heater of the converter for heating the catalyst in the catalytic converter. A sensor is provided for detecting whether or not the temperature of exhaust gases is higher than a prescribed standard temperature, so that it is possible to detect whether or not the temperature of the catalyst has reached a catalyst activation level responsive to an output signal of the sensor. When it is detected that the temperature of exhaust gases has reached the prescribed standard temperature, the application of electric power to the heater of the catalytic converter is stopped responsive to the output signal of the sensor. However, in this conventional catalytic converter, the sensor mounted in an exhaust passage downstream of the catalytic converter is subjected to an extremely high temperature due to the heat of exhaust gases passing into the exhaust passage. Thus, there is a problem in that the sensor in the conventional catalytic converter is very likely to experience major malfunctions, such as a short circuit or an open circuit. If a short circuit should occur in the sensor, a temperature of exhaust gases detected by the sensor is not increased to a correct temperature, which will cause occurrence of malfunctions in the apparatus. Malfunctions in the apparatus can cause such problems as overheating of the catalyst, damage to the catalytic converter or damage to the battery. Also, if an open circuit should occur in the sensor, the sensor may erroneously send a signal indicating a temperature much higher than the standard temperature. In such a case, electric power is not applied to the heater for heating the catalyst and the catalyst does not become active, thus causing a reduced rate of catalytic conversion of exhaust gases.

The conventional catalytic converter also has a problem in that a time period during which electric power is applied to the heater of the catalytic converter cannot be adjusted, and it is difficult to attain effective catalytic conversion of exhaust gases especially when a temperature of the catalyst is very low or very high before application of electric power to the heater is started.

SUMMARY OF THE INVENTION

Accordingly, it is a general object of the present invention to provide an improved exhaust emission control apparatus in which the above described problems are eliminated.

Another and more specific object of the present invention is to provide an exhaust emission control apparatus in which a catalyst in a catalytic converter is heated during a time period which is varied in accordance with a detected temperature of engine cooling water in order to safely and invariably attain efficient catalytic conversion of exhaust gases. The above mentioned object of the present invention can be achieved by an exhaust emission control apparatus which includes an electrically heatable catalytic converter mounted in an exhaust passage of an internal combustion engine, the catalytic converter having a catalyst for catalytic conversion of exhaust gases from the engine and a heating element for heating the catalyst to accelerate a rate of the catalytic conversion, a power supply for applying electric power to the heating element for heating the catalyst, a time setting part for calculating a time period during which electric power is applied to the heating element, the time period being calculated based on at least a heat capacity of the catalytic converter, a consumption power of the catalytic converter, a preset temperature of the heating element and a temperature of cooling water in the engine, and a control part for controlling application of electric power from the power supply to the heating element in accordance with the time period calculated by the time setting part in such a way that the application of electric power to the heating element is stopped when the time period since the application of electric power to the heating element is started has elapsed. According to the present invention, it is possible to invariably maintain the temperature of the catalytic converter in the vicinity of a preset standard temperature by applying power to the heating element during the time period calculated primarily based on a temperature of cooling water in the engine. Thus, it is possible to prevent the catalyst from being overheated if the catalyst has a relatively high temperature before the application of power to the heating element is started. And, if a malfunction occurs in a temperature sensor used together with the catalytic converter, the above mentioned resulting damage to the catalytic converter and the battery or a reduced rate of the catalytic conversion of exhaust gases can safely be prevented, thus increasing the reliability of the exhaust emission control apparatus.

Other objects and further features of the present invention will become apparent from the following detailed description when read in conjunction with the accompanying drawings.

BRIEF DESCRIPTION OF THE DRAWINGS

FIGS. 6A and 6B are a flow chart for explaining operations performed by an exhaust emission control apparatus in a second embodiment of the present invention.

DESCRIPTION OF THE PREFERRED EMBODIMENTS

Figure 1:
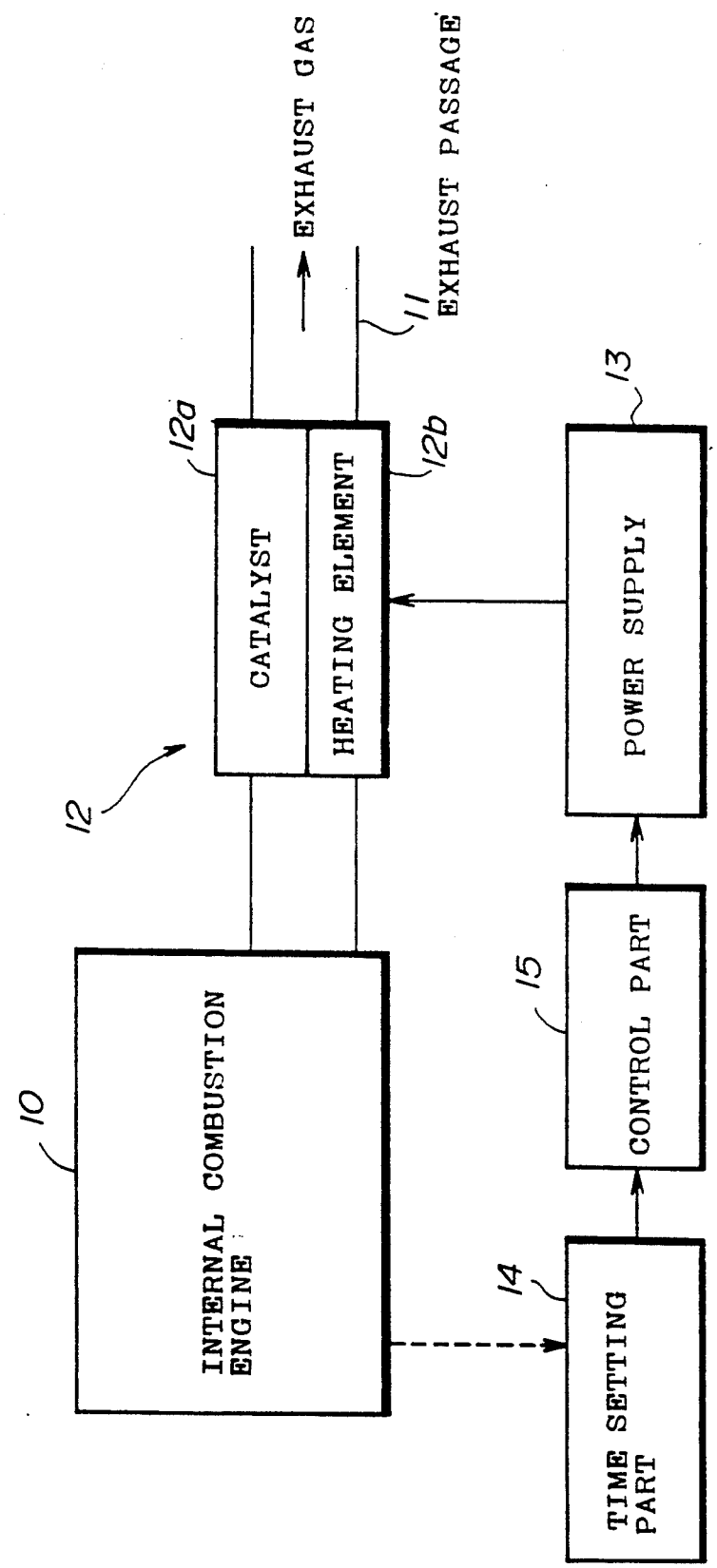
FIG. 1 is a block diagram showing a construction of an exhaust emission control apparatus according to the present invention.

A description will now be given of a construction of an exhaust emission control apparatus according to the present invention, with reference to FIG. 1. In FIG. 1, this exhaust emission control apparatus includes an electrically heatable catalytic converter (EHC) 12, a power supply 13 for applying electric power to the EHC 12, a time setting part 14, and a control part 15. The electrically heatable catalytic converter 12 having a catalyst 12a for performing catalytic conversion of exhaust gases and a heating element 12b for heating the catalyst 12a is mounted in an exhaust passage 11 of an internal combustion engine 10. The power supply 13 applies electric power to the heating element 12b so that the catalyst 12a is heated by the heating element 12b. The time setting part 14 calculates a time period during which electric power is applied to the heater 12b, based on at least a heat capacity of the EHC 12, a consumption power of the EHC 12, a preset standard temperature of the heating element 12b and a temperature of engine cooling water. When the time period, calculated by the time setting part 14, since the power supply 13 started applying electric power to the EHC 12 has elapsed, the control part 15 instructs the power supply 13 to stop applying electric power to the heating element 12b of the EHC 12.

The time period calculated by the time setting part 14 is not a constant value but instead varied depending on the temperature of engine cooling water at the time of calculation thereof and other factors (the preset standard temperature of the heating element, the heat capacity of the converter, the consumption power of the converter, etc.). Thus, the time period calculated by the time setting part 14 is the estimated amount of time required for the heating element 12b to reach the preset standard temperature after the elapse of the calculated time period during which power is applied to the EHC 12. The control part 15 controls the power supply 13 in such a way that the application of power to the heating element 12b is stopped when the time period since the power supply 13 started applying power to the heating element 12b has elapsed. Accordingly, it is possible for the present invention to keep a temperature of the heating element of the catalytic converter invariably in the vicinity of the preset standard temperature of the heating element, so that the catalyst can be safely and invariably maintained at a temperature appropriate for accelerating the rate of catalytic conversion of exhaust gases.

Figure 2:
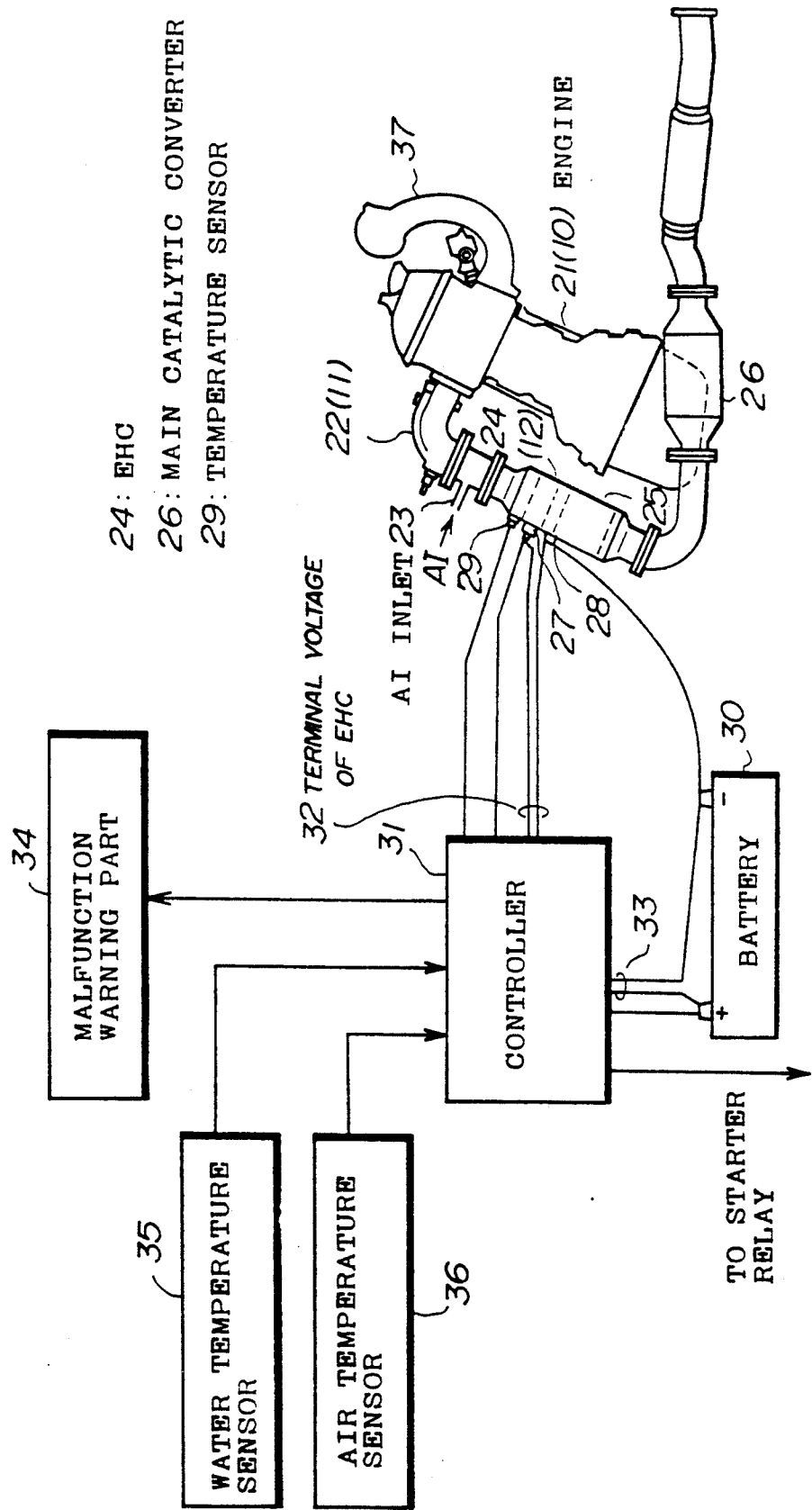
FIG. 2 is a view showing an internal combustion engine to which the present invention is applied.

FIG. 2 shows an embodiment of the present invention which is applied to an exhaust emission control system of an internal combustion engine. In FIG. 2, those parts which are the same as those corresponding parts shown in FIG. 1 are designated by the same reference numerals, and a description thereof will be omitted.

As shown in FIG. 2, an engine 21 (corresponding to the above mentioned internal combustion engine 10) includes an exhaust manifold 22 (corresponding to the above exhaust passage 11) which forms a part of an exhaust passage of the engine 21. This exhaust manifold 22 communicates with a combustion chamber (not shown) of the engine 21 via an exhaust valve (not shown). At an outlet of the exhaust manifold 22, an air injection inlet (AI inlet) 23 is provided for sending air from an air injection pump (not shown) into the exhaust passage. An electrically heatable catalytic converter (EHC) 24 (corresponding to the above EHC 12) is mounted in the exhaust passage downstream of the AI inlet 23. A start catalyst 25 and a main catalytic converter 26 are mounted in this order in the exhaust passage downstream of the EHC 24. The start catalyst 25 is a small-capacity catalyst for performing catalytic conversion of exhaust gases quickly. The catalytic conversion of exhaust gases is carried out by the above mentioned three components of the exhaust emission control apparatus of this embodiment, that is, the EHC 24, the start catalyst 25 and the main catalytic converter 26.

The electrically heatable catalytic converter (EHC) 24 is provided with a positive electrode 27 and a negative electrode 28. A temperature sensor 29, which is made from, for example, a thermocouple, is mounted in the exhaust passage in the vicinity of the EHC 24 to detect a temperature of a heating element 24b of the EHC 24. The negative electrode 28 of the EHC 24 is connected to a negative terminal (indicated by "−" in FIG. 2) of a battery 30, and the positive electrode 27 of the EHC 24 is connected to a positive terminal (indicated by "+" in FIG. 2) of the battery 30 through a controller 31. The battery 30 and the controller 31 form the above mentioned power supply 13.

A terminal voltage of the EHC 24 is applied to the controller 31 via lines 32 which are coupled to the electrodes 27 and 28 of the EHC 24. A terminal voltage of the battery 30 is applied to the controller 31 via lines 33 which are coupled to the positive and negative terminals of the battery 30. The controller 31 is respectively connected to a malfunction warning part 34, a water temperature sensor 35 and an air temperature sensor 36. The water temperature sensor 35 is mounted on an engine block of the engine 21 (the mounting portion of the sensor 35 is not shown in FIG. 2) and detects a temperature of engine cooling water in the engine 21. The air temperature sensor 36 is mounted in the vicinity of an air flow meter (not shown) in an intake passage upstream of an intake manifold 37 of the engine, and detects a temperature of intake air flowing into the engine 21. And, in the malfunction warning part 35, warning information of a malfunction which may occur in either the battery 30 or the EHC 24 is indicated in accordance with an instruction sent from the controller 31.

Figure 3:
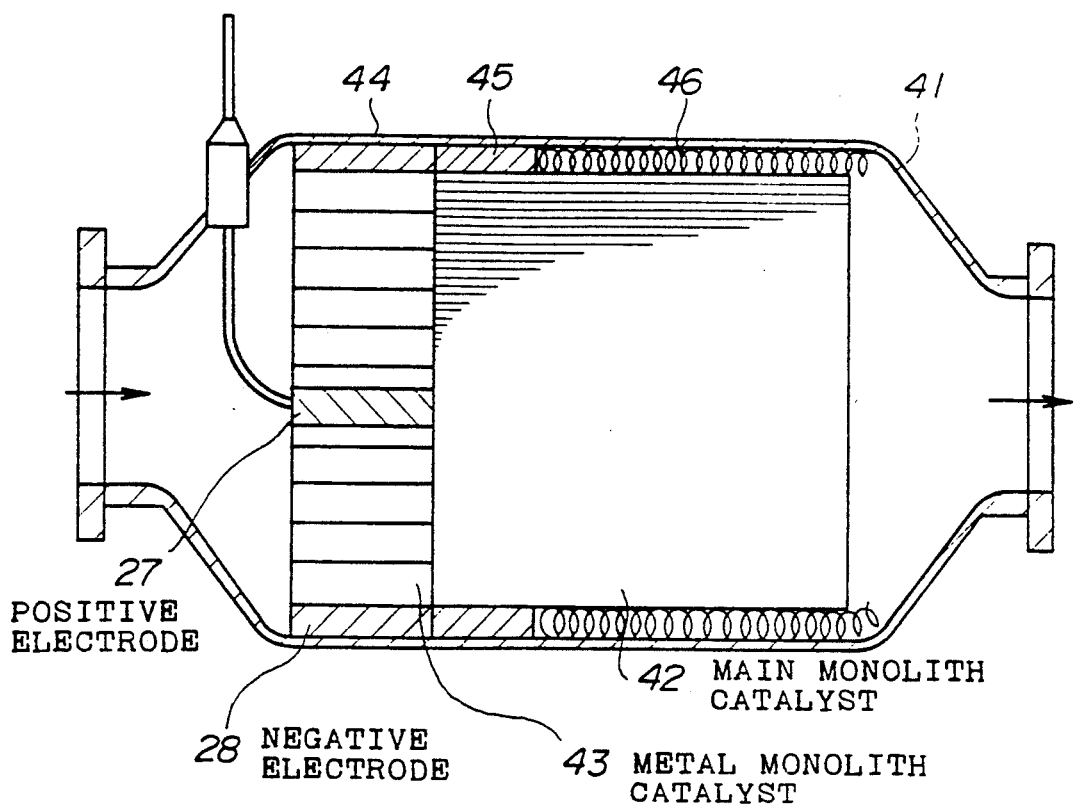
FIG. 3 is a view showing a construction of an electrically heatable catalytic converter.
Figure 4:
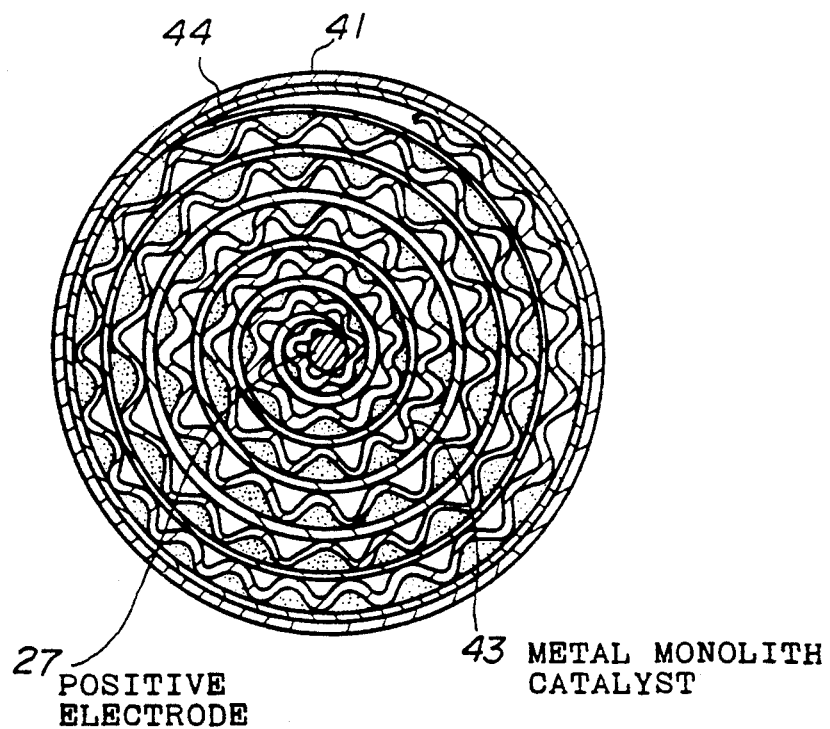
FIG. 4 is a sectional view of the converter shown in FIG. 3 taken in a direction perpendicular to an axial line of the converter.

FIGS. 3 and 4 show the construction of the electrically heatable catalytic converter (EHC) 24 used in the exhaust emission control apparatus of the present invention. A catalytic converter of this type is disclosed in, for example, Japanese Laid-Open Utility Model Application No. 63-67609, which is assigned to the same assignee as that of the present invention. In the EHC 24 shown in FIGS. 3 and 4, a main monolith catalyst 42 and a metal monolith catalyst 43 are installed in a case 41 so that they are arranged adjacent to each other along an axial line of the EHC 24 in which exhaust gases from the engine 24 flow in a direction as indicated by an arrow shown in FIG. 3. The main monolith catalyst 42 is a catalyst formed on a honeycomb monolithic substrate made of a ceramic material. The metal monolith catalyst 43 is a catalyst including a gamma-alumina coating formed on a honeycomb monolithic substrate. As can be seen from FIG. 4, the metal monolith catalyst 43 is supported at its outer periphery on the case 41 through a metallic frame 44. A seal 45 for hermitically closing an upstream part of the main monolith catalyst 42 in the EHC 24 is provided radially between the main monolith catalyst 42 and the case 41. A cushion member 46 made from a wire net is provided at a downstream part of the catalyst 42 and radially between the main monolith catalyst 42 and the case 41. As shown in FIGS. 3 and 4, the positive electrode 27 of the EHC 24 is provided in the central axis of the metal monolith catalyst 43 extending longitudinally in the direction, indicated by the arrow in FIG. 3, in which exhaust gases flow. The metallic frame 44 forms the outer periphery of the metal monolith catalyst 43 and the negative electrode 28 of the EHC 24.

By applying electric power to the metal monolith catalyst 43 of the EHC 24 through the positive and negative electrodes 27 and 28, the metal monolith catalyst 43 is heated in response to the electric power supplied and serves as the above mentioned heating element 12b of the converter 12. The temperature of the metal monolith catalyst 43 is thus raised to a catalyst activation level. Also, the temperature of exhaust gases flowing into the main monolith catalyst 42 is increased so that the main monolith catalyst 42 performs catalytic conversion of exhaust gases to reduce the amount of hydrocarbon (HC) and carbon monoxide (CO) therein. The main monolith catalyst 42 of the EHC 24 serves as the above mentioned catalyst 12a of the converter 12.

Figure 5A:
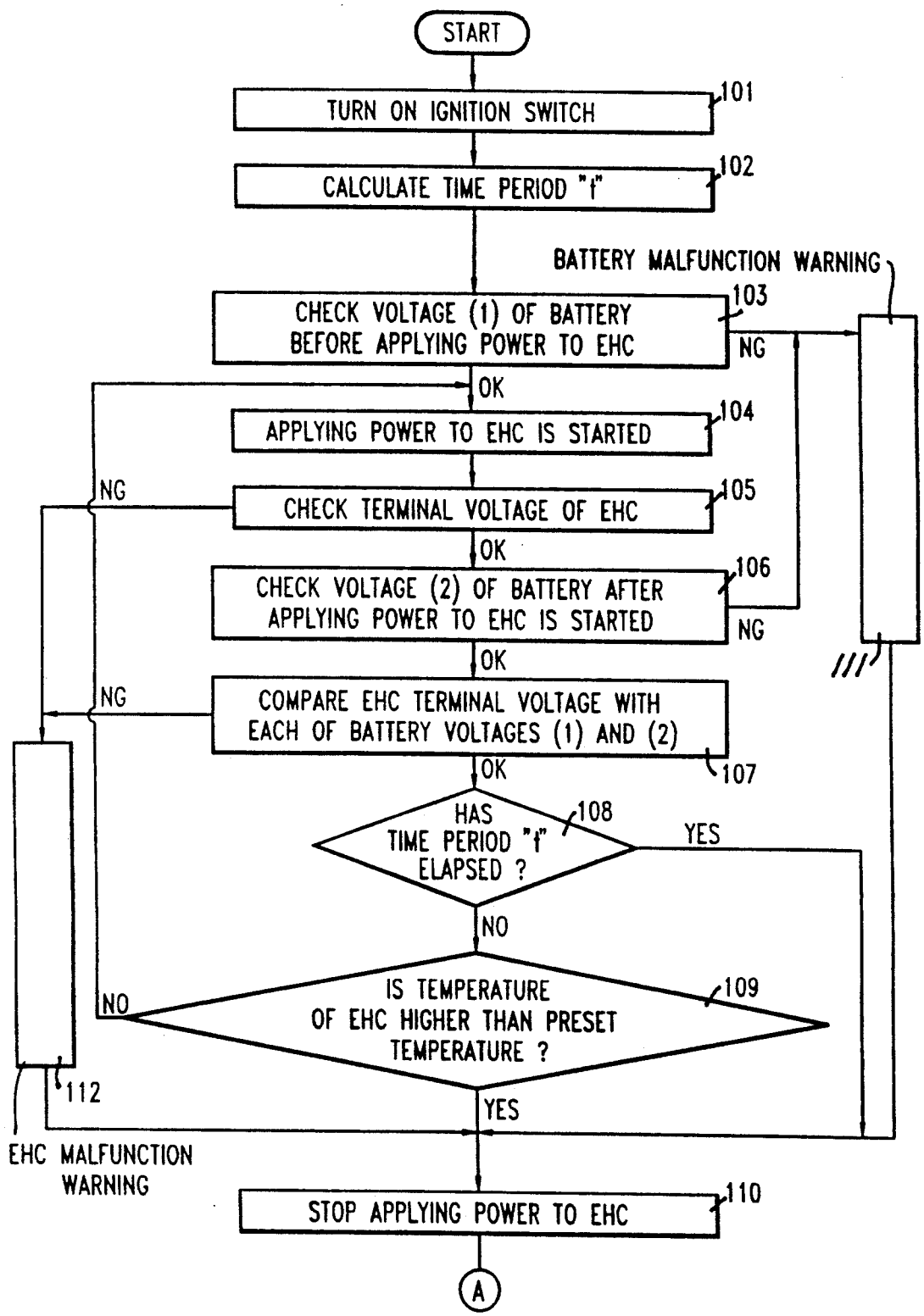
FIGS. 5A and 5B are a flow chart for explaining operations performed by an exhaust emission control apparatus in a first embodiment of the present invention.

Next, a description will be given of operations performed by the controller 31 of the exhaust emission control apparatus in a first embodiment of the present invention, with reference to FIGS. 5A and 5B. By performing these operations, the functions of the above mentioned time setting part 14 and control part 15 are realized. In step 101 in the flow chart in FIG. 5A, an ignition switch is turned ON. In step 102, a time period "t", during which electric power is applied by the controller 31 to the heating element of the EHC 24, is calculated according to the following formula. This time period "t" is an estimated time required for the heating element to reach a preset standard temperature To corresponding to a catalyst activation temperature.

$$t = C/W(T_o - 273a/(273 + T_w))273b/(273 + T_a) \quad (1)$$

In the above formula, To is the preset standard temperature of the heating element which is equal to, for example, 400 deg C., C. is a heat capacity of the EHC 24, W is a consumption power spent by the EHC 24, "a" and "b" are coefficients which are predetermined suitably, Tw is a detected temperature of engine cooling water detected based on an output signal of the water temperature sensor 35, and Ta is a detected temperature of intake air detected based on an output signal of the air temperature sensor 36. $273a/(273 + T_w)$ in the above formula denotes an estimated temperature of the EHC 24, and $273b/(273 + T_a)$ in the above formula is a correction factor which denotes the amount of energy radiated from the EHC 24. The standard temperature To, the heat capacity C and the consumption power W in the above formula are known constant values, but the water temperature Tw and the air temperature Ta are variables which are varied depending on the engine conditions at the time of calculation. Therefore, the time period "t" calculated in the step 102 is varied in accordance with the estimated temperature of the EHC 24 and the correction factor denoting the amount of the radiated energy.

In the present embodiment, the temperature of the EHC 24 is estimated based on the detected temperature Tw of engine cooling water, and a time period is determined primarily based on the estimated temperature of the EHC 24, the determined time period being corrected with the correction factor based on the detected temperature Ta of intake air in order to produce the time period "t" during which electric power is applied to the EHC 24. Therefore, in a case where the temperature of the EHC 24 is low, the time period during which electric power is applied to the EHC 24 is relatively long. In a case where the temperature of the EHC 24 is high, the time period during which electric power is applied to the EHC 24 is relatively short. In both cases, the heating element of the EHC 24 can safely be maintained at a temperature in the vicinity of the standard temperature To. Thus, it is possible for the present invention to prevent the heating element of the EHC from being damaged in a case where the application of electric power is started while the EHC 24 has a relatively high temperature, which damage occurs in the case of the conventional catalytic converter in which the time period during which electric power is applied to the heater of the converter is always constant.

In step 103, the controller 31 checks a voltage (1) of the battery 30 before the application of electric power to the EHC 24 is started. After it is confirmed that the voltage (1) of the battery 30 is higher than a predetermined level, in step 104 the application of electric power to the heating element of the EHC 24 is started by the controller 31. In step 105, the controller 31 checks a terminal voltage of the EHC 24. After it is confirmed that the terminal voltage of the EHC 24 is higher than a predetermined level, in step 106 the controller 31 checks a voltage (2) of the battery 30 after the application of electric power to the EHC 24 is started. If the battery 30 malfunctions, there is a possibility that the voltage (2) of the battery 30 will be rapidly reduced after it is confirmed that the voltage (1) of the battery 30 before the application of electric power is higher than the predetermined level. Therefore, the checking of the voltage of the battery 30 in the step 106 is necessary.

When the voltage (2) of the battery 30 is also higher than the predetermined level, in step 107 the terminal voltage of the EHC 24 is compared with each of the battery voltages (1) and (2). If an open circuit occurs in the heating element of the EHC 24, the controller 31 detects a high voltage from the battery 30 as being the terminal voltage of the EHC 24. If a short circuit occurs between the electrodes 27 and 28 of the EHC 24, the controller 31 detects an intermediate voltage as being the terminal voltage of the EHC 24. Thus, it is possible to detect whether or not a malfunction has occurred in the EHC 24 by performing the step 107.

When it is detected in the step 107 that no malfunction has occurred in the EHC 24, in step 108 the controller 31 detects whether or not the time period "t" calculated in the step 108 has elapsed since the application of electric power to the EHC 24 was started. If the time period "t" has not elapsed yet, in step 109 the controller 31 checks whether or not a temperature of the EHC 24, detected by the temperature sensor 29 and sent to the controller 31, is higher than a preset standard temperature corresponding to a catalyst activation temperature. When the detected temperature of the EHC 24 is not higher than the standard temperature, the procedure is returned to the step 104 so that the application of electric power to the EHC 24 is re-started and the steps 105 through steps 108 are performed again.

When it is detected in the step 109 that the temperature of the EHC 24 is higher than the standard temperature before the time period "t" has elapsed, the controller 31 stops applying electric power to the EHC 24 in step 110. When it is detected in the step 108 that the time period "t" has elapsed since the application of power to the EHC 24 was started, the controller 31 stops applying power to the EHC 24 in the step 110, regardless of whether or not the EHC 24 is at a high temperature. When the time period "t" has elapsed, it is presumed that the temperature of the heating element has been raised to the standard temperature or a temperature in the vicinity thereof.

If a short circuit should occur in the temperature sensor 29, the detected temperature of exhaust gases is not increased to the correct temperature. In the case of the conventional converter, serious problems such as overheating of the catalyst, damage to the catalyst and damage to the battery may arise. However, in the case of the present invention, the application of electric power to the heating element of the EHC 24 is always stopped by the controller 31 when the time period "t" has elapsed, regardless of whether or not the detected temperature is higher than the standard temperature. Therefore, it is possible for the present invention to prevent the occurrence of the above problems.

If an open circuit should occur in the temperature sensor 29, the application of power to the heating element is not started and the catalyst does not quickly become active, which results in an inefficient catalytic conversion of exhaust gases in the case of the conventional converter. However, in the case of the present invention, the application of electric power to the heating element is started in the step 104, regardless of whether or not the detected temperature is higher than the standard temperature, and the application of electric power to the heating element is continuously performed only during the calculated time period "t". Therefore, it is possible for the present invention to prevent the occurrence of the above problems. Thus, the exhaust emission control apparatus according to the present invention has a fail-safe function against a malfunction occurring in the sensor 29 by performing the steps 102, 104, 108 and 110 operations performed by the exhaust emission control apparatus of this embodiment.

When it is detected in either the step 103 or the step 106 that a voltage of the battery 30 is not higher than the predetermined level, in step 111 the controller 31 notifies the malfunction warning part 34 shown in FIG. 2 that a malfunction has occurred in the battery 30. Then, the application of power to the EHC 24 is stopped in the step 110. When it is detected in either the step 105 or the step 107 that a terminal voltage of the EHC 24 is not higher than the predetermined level, the controller 31, in step 112, gives a warning of a malfunction occurring in the EHC 24 to the malfunction warning part 34, and then stops applying power to the EHC 24 in the step 110.

Figure 5B:
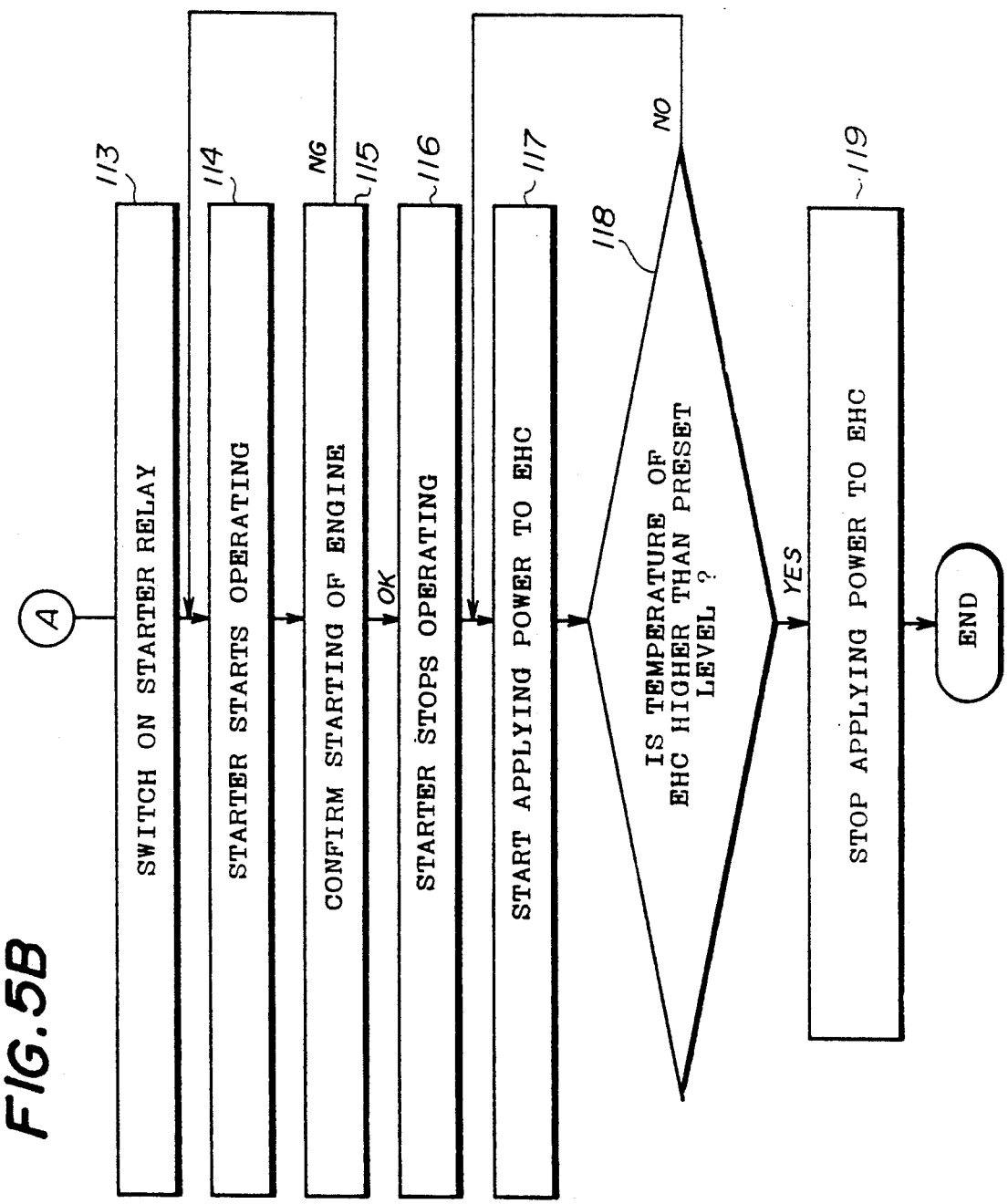

After the application of power to the EHC 24 is stopped in the step 110, the controller 31 switches ON a starter relay in step 113 shown in FIG. 5B. In step 114, a starter starts operating after the starter relay is switched ON. In step 115, the starter is continuously operated until it is confirmed that the engine 21 has started operating by means of the starter. After the starting of the engine 21 is confirmed in the step 115, the starter stops operating in step 116. When the engine 21 is in a given operating condition (which is, for example, when an air-fuel ratio feedback control routine is not yet performed) after the engine is started, secondary air is sent by an injection air pump into the AI inlet 23 in the exhaust passage upstream of the EHC 24, which inlet 23 is shown in FIG. 2. The secondary air entering the exhaust passage is mixed with exhaust gases from the combustion chamber of the engine 21, and pollutant gases such as HC and CO, included in the exhaust gases, are subjected to the catalytic conversion performed by the EHC 24. The temperature of the EHC 24 is reduced owing to the secondary air sent into the exhaust passage. In step 117, the controller 31 again starts applying electric power from the battery 30 to the EHC 24. The application of power to the EHC 24 is continuously performed until it is detected in step 118 that a temperature of the EHC 24 is higher than the standard temperature corresponding to the catalyst activation temperature. When it is detected in the step 118 that a temperature of the EHC 24 is higher than the standard temperature, the controller 31 stops applying electric power to the EHC 24 in step 119. Then, the operations performed by the controller 31 of the exhaust emission control apparatus in the first embodiment end as shown in FIG. 5B.

Next, a description will be given of a second embodiment of the present invention, with reference to FIGS. 6A and 6B. In the first embodiment shown in FIGS. 5A and 5B, a time period "t" is calculated and the application of electric power to the EHC 24 during the time period is performed before the engine 21 starts operating. In this second embodiment, the calculation of a time period "t" and the application of power to the EHC 24 during the time period are performed after the engine 21 starts operating. Other features of the second embodiment shown in FIGS. 6A and 6B are essentially the same as those of the first embodiment shown in FIGS. 5A and 5B, and a description thereof will be omitted.

Figure 6A:
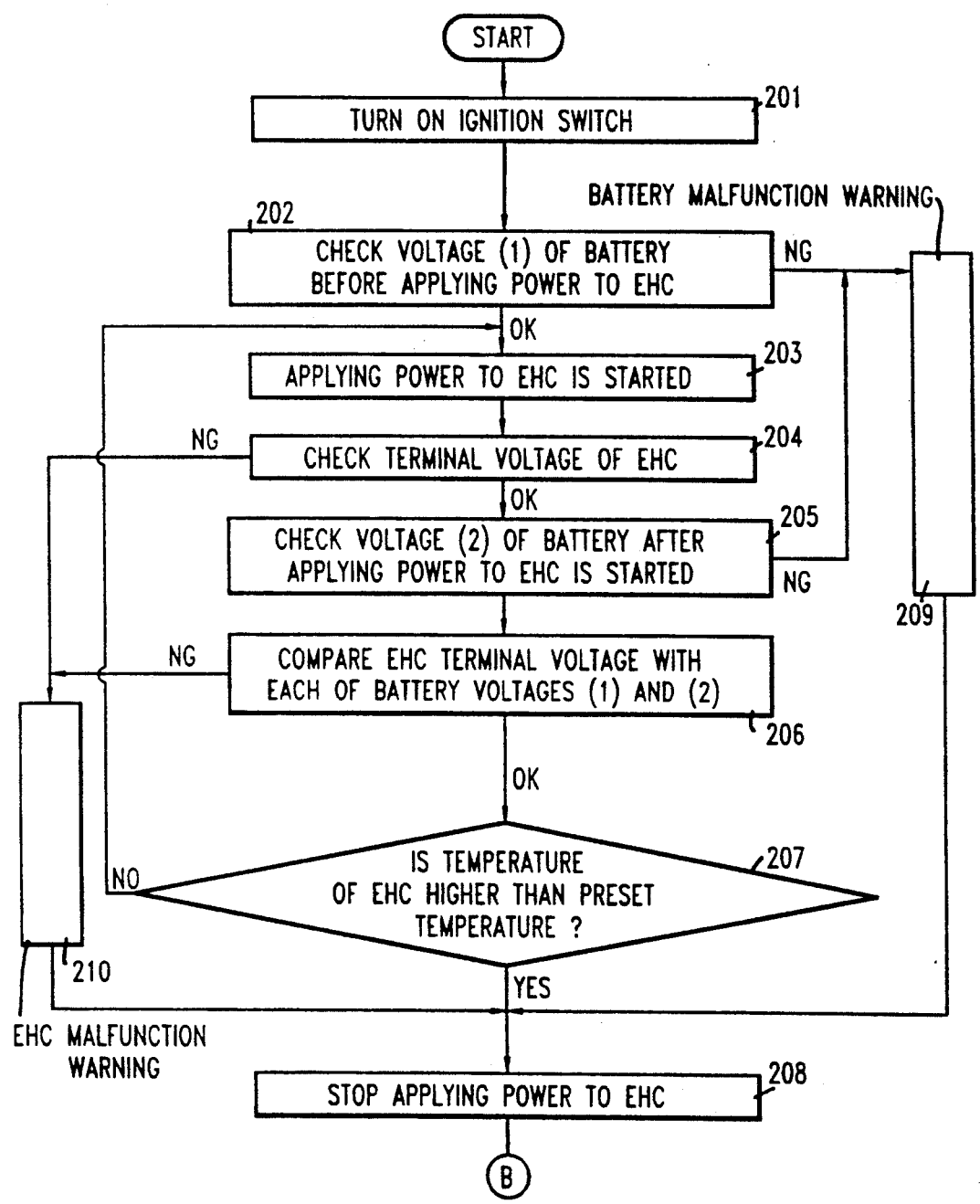

In FIG. 6A, an ignition switch is turned ON in step 201. The voltage (1) of the battery 30 is checked in step 202, the application of power to the EHC 24 is started in step 203, the terminal voltage of the EHC 24 is checked in step 204, the voltage (2) of the battery 30 is checked in step 205, and the terminal voltage of the EHC 24 is compared with each of the voltages (1) and (2) of the battery 30 in step 206. When all the above voltages are confirmed to be normal, step 207 detects whether or not a temperature of the heating element of the EHC 24 is higher than the preset standard temperature. The application of electric power to the EHC 24 is continuously performed until the temperature of the heating element is higher than the standard temperature. When it is detected in the step 207 that the temperature of the heating element is higher than the standard temperature, step 208 stops applying electric power to the EHC 24. If a malfunction in the battery 30 is detected when the battery voltage is checked in either the step 202 or the step 205, step 209 gives a warning of the malfunction occurring in the battery 30 to the malfunction warning part 34. If a malfunction in the EHC 24 is detected when the terminal voltage of the EHC 24 is checked in either the step 204 or the step 206, step 210 gives a warning of the malfunction occurring in the EHC 24 to the malfunction warning part 34. After either the step 209 or the step 210 is done, the application of electric power to the EHC 24 is stopped in the step 208.

In FIG. 6B, step 211 switches ON a starter relay after the application of electric power to the EHC 24 is stopped. In step 212, a starter starts operating after the starter relay is switched ON. In step 213, the starter is continuously operated until it is confirmed that the engine 21 has started operating by means of the starter. After the starting of the engine 21 is confirmed in the step 213, the starter stops operating in step 214. As described in the above first embodiment, secondary air is sent into the AI inlet 23 in the exhaust passage upstream of the EHC 24 after the engine 21 starts operating, and the temperature of the EHC 24 is reduced owing to the secondary air sent into the exhaust passage.

In step 215, a time period "t" during which electric power is applied to the heating element of the EHC 24 is calculated according to the above mentioned formula (1). This time period "t" is an estimated time required for the heating element to reach the preset standard temperature. In step 216, the application of electric power to the EHC 24 is started. Then, step 217 detects whether or not the time period "t" since the application of power to the EHC 24 was started has elapsed. If it is detected that the time period "t" has not elapsed, step 218 detects whether or not a temperature of the heating element of the EHC 24 is higher than the preset standard temperature. If it is detected that the temperature of the heating element is not higher than the standard temperature, the application of power to the EHC 24 in the step 216 and the checking of the time period "t" in the step 217 are continuously performed.

If the step 217 detects that the time period "t" has elapsed, step 219 stops applying electric power to the EHC 24, regardless of whether or not the temperature of the heating element is higher than the standard temperature, and then the procedure shown in FIGS. 6A and 6B ends. Thus, the exhaust emission control apparatus according to the present invention has a fail-safe function for preventing a malfunction occurring in the temperature sensor 29. Even if the time period "t" does not elapse, when the step 218 detects that the temperature of the heating element is higher than the standard temperature, the step 219 stops applying electric power to the EHC 24.

As described above, according to the present invention, it is possible to prevent the catalytic converter from being overheated when the catalyst has a high temperature before the application of power to the heating element is started. Also, if a malfunction should occur in the temperature sensor provided together with the catalytic converter after the engine starts operating, damage to the catalytic converter and a reduced rate of catalytic conversion of exhaust gases, which may arise in the case of the conventional converter, can safely be prevented by the present invention.

Further, the present invention is not limited to the above described embodiments, and variations and modifications may be made without departing from the scope of the present invention. For example, in a modified exhaust emission control apparatus, it is unnecessary to provide a temperature sensor together with the electrically heatable catalytic converter. In the case of this exhaust emission control apparatus, electric power is applied to the catalytic converter during the time period "t" and no temperature sensor is used therein. However, when the first embodiment shown in FIGS. 5A and 5B is applied to the above modified apparatus, it is necessary to heat the catalytic converter for a given time period after the engine starts operating to safely perform the catalytic conversion. And, when the second embodiment shown in FIGS. 6A and 6B is so applied, it is necessary to pre-heat the catalytic converter for a given time period before the engine starts operating.

What is claimed is:

1. An exhaust emission control apparatus comprising:
   an electrically heatable catalytic converter mounted in an exhaust passage of an internal combustion engine, said catalytic converter having a catalyst for catalytic conversion of exhaust gases from said engine and a heating element for heating said catalyst to accelerate a rate of the catalytic conversion;
   a power supply for applying electric power to said heating element for heating said catalyst;
   time setting means for calculating a time period during which electric power is applied to said heating element, said time period being calculated based on at least a heat capacity of the catalytic converter, a consumption power of the catalytic converter, a preset standard temperature of the heating element and a temperature of cooling water in said engine; and
   control means for controlling application of electric power from said power supply to said heating element in accordance with the time period calculated by said time setting means in a way that the application of electric power to the heating element is stopped when said time period since the application of electric power to the heating element is started has elapsed.

2. An exhaust emission control apparatus as claimed in claim 1, wherein, each time an ignition switch is turned on, said time setting means calculates said time period based on a temperature of cooling water detected by a water temperature sensor mounted on the engine, a temperature of intake air detected by an air temperature sensor mounted in an intake passage of the engine, the heat capacity of the converter, the consumption power of the converter, and the preset standard temperature of the heating element.

3. An exhaust emission control apparatus as claimed in claim 1, wherein,, before the engine starts operating, said time setting means calculates said time period based on a temperature of cooling water detected by a water temperature sensor mounted on the engine, a temperature of intake air detected by an air temperature sensor mounted in an intake passage of the engine, the heat capacity of the converter, the consumption power of the converter, and the preset standard temperature of the heating element.

4. An exhaust emission control apparatus as claimed in claim 1, wherein, after the engine starts operating, said time setting means calculates said time period based on a temperature of cooling water detected by a water temperature sensor mounted on the engine, a temperature of intake air detected by an air temperature sensor mounted in an intake passage of the engine, the heat capacity of the converter, the consumption power of the converter, and the preset standard temperature of the heating element.

5. An exhaust emission control apparatus as claimed in claim 1, wherein said control means stops the application of electric power from the power supply to the heating element if it is detected that a temperature of the heating element is higher than the preset standard temperature after the application of electric power to the heating element is started.

6. An exhaust emission control apparatus as claimed in claim 1, further comprising a malfunction warning part in which warning information of a malfunction occurring in either the power supply or the catalytic converter is indicated in accordance with an instruction sent from the control means if a malfunction is detected.

7. An exhaust emission control apparatus as claimed in claim 6, wherein said control means checks a voltage of said power supply before and after the application of electric power to the heating element is started, said control means giving an instruction to the malfunction warning part if said voltage of said power supply is not higher than a predetermined level, so that warning information of a malfunction of the power supply is indicated in the malfunction warning part.

8. An exhaust emission control apparatus as claimed in claim 6, wherein said control means, checks a terminal voltage of the catalytic converter being compared with a voltage of the power supply after the application of electric power to the heating element is started, said control means giving an instruction to the malfunction warning part if an open circuit or a short, circuit in the catalytic converter is detected, so that warning information of a malfunction of the catalytic converter is indicated in the malfunction warning part.

9. An exhaust emission control apparatus as claimed in claim 1, wherein said time period t during which electric power is applied to the heating element is calculated by said time setting means in accordance with the following formula:

$$t = C/W(To - 273a/(273 + Tw))273b/(273 + Ta)$$

where To is the preset standard temperature of the heating element, C is a heat capacity of the converter, W is a consumption power used-by the converter, a and b are predetermined coefficients, Tw is a temperature of cooling water detected based on a signal from a water temperature sensor mounted on the engine, and Ta is a temperature of intake air detected based on a signal from an air temperature sensor mounted in an intake passage of the engine.

* * * * *

UNITED STATES PATENT AND TRADEMARK OFFICE
CERTIFICATE OF CORRECTION

PATENT NO. : 5,224,335
DATED : July 6, 1993
INVENTOR(S) : Kouji YOSHIZAKI

It is certified that error appears in the above-indentified patent and that said Letters Patent is hereby corrected as shown below:

Column 8, line 14, delete "the" before "step".

Column 9, line 15, delete "the" before "step".

Column 9, line 19, delete "the" before "step 204" and "the" before "step 206".

Column 9, line 21, delete "the" before "step".

Column 9, line 22, delete "the" before "step".

Column 9, line 23, delete "the" before "step".

Column 9, line 54, delete "the" before "step".

Column 9, line 55, delete "the" before "step".

Column 9, line 56, delete "the" before "step".

Column 12, line 13, delete the comma after "short".

Signed and Sealed this

Twenty-eighth Day of November 1995

Attest:

BRUCE LEHMAN

Attesting Officer

Commissioner of Patents and Trademarks